United States Patent
Tokunaga et al.

(10) Patent No.: US 7,988,867 B2
(45) Date of Patent: *Aug. 2, 2011

(54) METHOD OF TREATING SILICON POWDER-CONTAINING DRAINAGE WATER

(75) Inventors: Shinji Tokunaga, Shunan (JP); Yoshiaki Koga, Shunan (JP); Toshihiko Inoue, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 489 days.

This patent is subject to a terminal disclaimer.

(21) Appl. No.: 11/990,758

(22) PCT Filed: Aug. 17, 2006

(86) PCT No.: PCT/JP2006/316535
§ 371 (c)(1),
(2), (4) Date: Feb. 21, 2008

(87) PCT Pub. No.: WO2007/023872
PCT Pub. Date: Mar. 1, 2007

(65) Prior Publication Data
US 2009/0242491 A1 Oct. 1, 2009

(30) Foreign Application Priority Data

Aug. 24, 2005 (JP) .................. 2005-243161
Dec. 15, 2005 (JP) .................. 2005-361388

(51) Int. Cl.
*C02F 1/56* (2006.01)
(52) U.S. Cl. ........................ 210/727; 210/716
(58) Field of Classification Search ............. 210/716
See application file for complete search history.

(56) References Cited

U.S. PATENT DOCUMENTS

| | | | |
|---|---|---|---|
| 4,923,629 A | 5/1990 | Hasegawa et al. | |
| 5,965,027 A * | 10/1999 | Allen et al. | 210/638 |
| 6,203,711 B1 | 3/2001 | Moffett | |
| 6,258,277 B1 * | 7/2001 | Salmen et al. | 210/638 |
| 6,468,492 B2 | 10/2002 | Poncelet | |
| 6,572,771 B2 * | 6/2003 | Yamasaki et al. | 210/605 |
| 7,338,617 B2 * | 3/2008 | Koga et al. | 252/179 |
| 7,674,374 B2 * | 3/2010 | Robles | 210/175 |
| 2003/0019815 A1 | 1/2003 | Koga et al. | |
| 2005/0115908 A1 | 6/2005 | Umezawa et al. | |
| 2005/0121377 A1 | 6/2005 | Koga et al. | |

FOREIGN PATENT DOCUMENTS

| | | |
|---|---|---|
| EP | 1 260 484 A2 | 11/2002 |
| JP | 3-14516 B2 | 2/1991 |
| JP | 4-75796 B2 | 12/1992 |
| JP | 6-71246 A | 3/1994 |
| JP | 06-134469 A | 5/1994 |
| JP | 10-034161 A | 2/1998 |
| JP | 10-323675 A | 12/1998 |
| JP | 11-33560 A | 2/1999 |
| JP | 2000-140861 A | 5/2000 |
| JP | 2001-276599 A | 10/2001 |
| JP | 2002-18206 A | 1/2002 |
| JP | 2002-326003 A | 11/2002 |
| JP | 2003-038908 A | 2/2003 |
| JP | 2003-221222 A | 8/2003 |
| JP | 2003-285074 A | 10/2003 |
| JP | 2004-261708 A | 9/2004 |
| JP | 2005-152880 A | 6/2005 |
| JP | 2003-500192 A | 1/2007 |

OTHER PUBLICATIONS

Office Action dated Mar. 30, 2010 issued in corresponding Canadian Application No. 2,620,058.
Office Action dated Aug. 18, 2010 in corresponding U.S. Appl. No. 11/990,739.
Office Action dated Jan. 6, 2011 in corresponding U.S. Appl. No. 11/990,739.
Office Action dated Mar. 29, 2010 issued in Canadian Application No. 2,620,066 corresponding to U.S. Appl. No. 11/990,739.

* cited by examiner

*Primary Examiner* — Peter A Hruskoci
(74) *Attorney, Agent, or Firm* — Birch, Stewart, Kolasch & Birch, LLP

(57) ABSTRACT

A method of treating silicon powder-containing drainage water, comprising the steps of:
including an inorganic flocculant composed of a silica sol-water-soluble metal salt having a molar ratio of silicon to metal of 0.05 to 3.0 into drainage water containing silicon powders to ensure that the metal concentration becomes 15 to 300 mg/L; and
adding an organic polymer flocculant.
In this method, the coagulation treatment of drainage water containing fine silicon powders can be carried out.

3 Claims, No Drawings

METHOD OF TREATING SILICON POWDER-CONTAINING DRAINAGE WATER

This application is the U.S. national stage under 35 U.S.C. §371 of international application PCT/JP2006/316535, filed Aug. 17, 2006. Priority is claimed under 35 U.S.C. §119 to Japanese applications numbers 2005-243161 (filed Aug. 24, 2005) and JP 2005-361388 (filed Dec. 15, 2005).

TECHNICAL FIELD

The present invention relates to a method of treating silicon powder-containing drainage water. More specifically, it relates to a method of treating drainage water containing very fine silicon powders such as metal silicon or silicon chips.

BACKGROUND ART

Drainage water containing silicon powders which will become waste, more specifically drainage water containing fine metal silicon or silicon chips is discharged from the following places.

For example, metal silicon is used in the manufacture of silicon chloride which is a raw material of silicon to be reacted with hydrogen chloride. When this silicon chloride is collected, drainage water containing fine metal silicon used for the reaction is discharged. Since polycrystal silicon rods, monocrystal silicon rods and silicon wafers all of which are obtained from the above silicon chloride become products through cutting and polishing steps, drainage water containing silicon chips is discharged. Since silicon powders contained in this silicon powder-containing drainage water containing metal silicon or silicon chips are very fine particles (especially silicon chips), a coagulation treatment is difficult and various treating methods are proposed.

For example, there is proposed a method in which drainage water containing metal silicon chips is treated by adding an inorganic flocculant such as aluminum chloride and adjusting its pH to 10 or more so as to suspend a metal silicon agglomerate (refer to JP-A 10-323675). Although the above method is excellent because the concentration of the residual chips in the finally obtained water becomes low, as pH is adjusted to 10 or more, hydrogen may be generated through a reaction between the metal silicon powder and water. Therefore, there is room for the improvement of operation efficiency.

Further, there are proposed a method in which silicon powder-containing drainage water is treated with pressurized water containing fine air bubbles by adding an inorganic flocculant, a floating aid and a polymer flocculant (JP-B 3-14516) and a method in which silicon powder-containing drainage water is treated by adding a pH control agent or antioxidant and further adding an inorganic flocculant (JP-A 2004-261708).

However, in the method disclosed by JP-B 3-14516, since the drainage water is treated with pressurized water containing fine air bubbles, the process becomes complicated and there is room for the improvement of operation efficiency. In the method disclosed by JP-A 2004-261708, the sedimentation rate of the obtained agglomerate is low and the turbidity of the finally obtained water cannot be reduced fully. Therefore, there is room for improvement.

Further, JP-B 4-75796 discloses a water treating flocculant composed of a silica sol-metal salt. However, in the method disclosed by JP-B 4-75796, the treatment of only water having a given turbidity is carried out and the method of treating silicon powder-containing drainage water which is the target of the present invention is not disclosed.

DISCLOSURE OF THE INVENTION

It is therefore an object of the present invention to provide a method of treating drainage water containing silicon powders hard to be subjected to a coagulation treatment, which has high operation efficiency and a high agglomerate sedimentation rate and can fully reduce the turbidity of water after an agglomerate is separated.

The inventors of the present invention have conducted intensive studies to solve the above problem. As a result, they have found that the above object can be attained by including a specific silica sol-water-soluble metal salt into the silicon powder-containing drainage water and adding an organic polymer flocculant. The present invention has been accomplished based on this finding.

That is, the present invention is a method of treating silicon powder-containing drainage water, comprising the steps of:

including an inorganic flocculant composed of a silica sol-water-soluble metal salt having a molar ratio of silicon to metal of 0.05 to 3.0 into drainage water containing silicon powders to ensure that the concentration of the metal becomes 15 to 300 (mg/L); and adding an organic polymer flocculant.

BEST MODE FOR CARRYING OUT THE INVENTION

The present invention will be described in detail hereinunder.

The present invention is a method of treating silicon powder-containing drainage water, comprising the steps of including an inorganic flocculant composed of a specific silica sol-water-soluble metal salt into drainage water containing silicon powders and adding an organic polymer flocculant.

In the present invention, the expression "silicon powder-containing drainage water" means drainage water containing fine silicon powders which are suspended in the drainage water. Examples of the drainage water include drainage water containing metal silicon which is discharged at a factory for manufacturing silicon chloride, and drainage water containing silicon chips which is discharged when polycrystal silicon, monocrystal silicon and wafer are processed or cut at a factory for manufacturing silicon from silicon chloride. This silicon powder-containing drainage water does not contain powders including elemental silicon other than silicon powders. For example, at a factory for manufacturing silicon chloride, a mixture of silica-containing drainage water which is by-produced when silicon chlorides are removed and drainage water containing silicon powders is not the target of treatment in the present invention.

In the present invention, the silicon powder-containing drainage water is not particularly limited but its pH is preferably controlled to less than 10 as it contains silicon powders.

By controlling the pH of the silicon powder-containing drainage water to less than 10, a reaction between the silicon powders and water is suppressed to reduce the amount of generated hydrogen. Especially drainage water containing metal silicon discharged at a factory for manufacturing silicon chloride is discharged as an acid solution. Since it is difficult to handle when the drainage water is acid, it is often treated with an alkali. Therefore, it is preferred to control pH in this case. The lower limit of pH is not particularly limited but preferably 5 or more when handling ease is taken into consideration.

In the present invention, the amount of suspended matter such as metal silicon and silicon chips (silicon powders) contained in the above silicon powder-containing drainage water is preferably 0.05 mass % or more when a coagulation treatment which will be detailed hereinafter is carried out. When the amount of the silicon powders is 0.05 mass % or more, the amount of the finally obtained treated water can be made small and the drainage water can be treated efficiently. The upper limit of the amount of the silicon powders is not particularly limited but preferably 3 mass % or less. Although the coagulation treatment of the present invention is possible even when the amount of the silicon powders is larger than 3 mass %, direct solid-liquid separation by a filter press is efficient in this case.

In the present invention, silicon powders which are contained in the above silicon powder-containing drainage water and existent in the drainage water as suspended matter become the target of a coagulation treatment. Particularly in a coagulation treatment which will be detailed hereinafter and is advanced technically, even very fine particles having an average particle diameter of 0.01 to 30 μm, further 0.05 to 20 μm can be treated.

In the treating method of the present invention, an inorganic flocculant composed of a silica sol-water-soluble metal salt having a molar ratio of silicon to metal of 0.05 to 3.0 is included into the above silicon powder-containing drainage water to ensure that the metal concentration becomes 15 to 300 mg/L. The temperature for the coagulation treatment is not particularly limited but preferably 5 to 40° C., more preferably 10 to 30° C. when operation efficiency is taken into consideration. To include the inorganic flocculant composed of a silica sol-water-soluble metal salt having a molar ratio of silicon to metal of 0.05 to 3.0 into the above silicon powder-containing drainage water, the inorganic flocculant may be added to the above silicon powder-containing drainage water continuously or in multiple stages to ensure that the above metal concentration is achieved.

In the present invention, the above inorganic flocculant is a silica sol-water-soluble metal salt having a molar ratio of silicon to metal of 0.05 to 3.0, preferably a silica sol-aluminum salt or a silica sol-iron salt. Examples of the water-soluble metal salt in the silica sol-water-soluble metal salt include aluminum sulfate, ferric chloride, ferrous sulfate and iron polysulfate. In the present invention, by using this silica sol-water-soluble metal salt, the sedimentation rate of an agglomerate after the addition of an organic polymer flocculant can be increased and the turbidity of the supernatant can be reduced to 10 degrees or less to remove the suspended matter to a very low concentration.

In the present invention, the inorganic flocculant composed of the above silica sol-iron salt is a composite containing silica sol which is a polymer and iron and can be obtained by mixing ferric chloride, ferrous sulfate or iron polysulfate with silica sol. The inorganic flocculant composed of the above silica sol-aluminum salt is a composite containing silica sol which is a polymer and aluminum and can be obtained by mixing aluminum sulfate with silica sol.

In the present invention, the inorganic flocculant composed of the above silica sol-water-soluble metal salt has a molar ratio of silicon to metal (more specifically, iron or aluminum) (to be referred to as "Si/Fe molar ratio" when the metal is iron and "Si/Al molar ratio" when the metal is aluminum hereinafter) of 0.05 to 3.0. When the molar ratio of silicon to metal is 0.05 to 3.0, the turbidity of the supernatant can be further reduced and the sedimentation rate of the agglomerate can be increased to enhance separation efficiency. When the molar ratio of silicon to metal is lower than 0.05, the sedimentation rate of the agglomerate becomes low and the turbidity of the supernatant becomes high disadvantageously. When the molar ratio of silicon to metal is higher than 3.0, the sedimentation rate of the agglomerate becomes low disadvantageously. When the turbidity of the supernatant and the sedimentation rate of the agglomerate are taken into consideration, the molar ratio of silicon to metal is preferably 0.05 to 1.5. When an inorganic flocculant composed of a silica sol-aluminum salt is used out of the inorganic flocculants composed of silica sol-water-soluble metal salts, the supernatant is not stained and therefore is easily recycled.

A detailed description is subsequently given of the method of manufacturing an inorganic flocculant composed of a silica sol-water-soluble metal salt.

In the present invention, to prepare an inorganic flocculant composed of a silica sol-aluminum salt having an Si/Al molar ratio of 0.05 to 3.0, silica sol is produced through a reaction between an aqueous solution of sodium silicate and mineral acid containing no halogen and then mixed with aluminum sulfate to ensure that the Si/Al molar ratio becomes 0.05 to 3.0. To prepare an inorganic flocculant composed of a silica sol-iron salt having an Si/Fe molar ratio of 0.05 to 3.0, silica sol is produced through a reaction between an aqueous solution of sodium silicate and mineral acid containing no halogen and then mixed with ferric chloride to ensure that the Si/Fe molar ratio becomes 0.05 to 3.0.

To enable the obtained inorganic flocculant composed of a silica sol-water-soluble metal salt to show an excellent effect in the present invention, it is preferred that the silica sol should be produced by the method disclosed by JP-A 2003-221222 and then mixed with aluminum sulfate or ferric chloride.

That is, it is preferred that a mixture obtained by bringing an aqueous solution of sodium silicate into collision with mineral acid containing no halogen such as sulfuric acid in a Y or T type reactor should be aged and diluted to produce the silica sol which is then mixed with aluminum sulfate or ferric chloride. The above term "aging" means that the polymerization of the silica sol is promoted in the mixture containing the silica sol.

In the present invention, an inorganic flocculant having a pH of 1.5 to 2.5 and an $SiO_2$ concentration of 5 to 25 g/L is preferred as the above inorganic flocculant composed of the above silica sol-water-soluble metal salt because pH and the SiO$_2$ concentration are well balanced. The viscosity of the above silica sol-water-soluble metal salt is preferably 1 to 5 mPa·S.

The inorganic flocculant composed of the silica sol-water-soluble metal salt which satisfies the above ranges can be manufactured by producing silica sol having a viscosity of 3 to 6 mPa·S in a Y or T type reactor and mixing aluminum sulfate or ferric chloride with this silica sol. By using the silica sol having the above viscosity, a silica sol-based inorganic flocculant having a high degree of polymerization and an expanded bead-like structure can be prepared efficiently in a short period of time.

In the present invention, the inorganic flocculant composed of the above silica sol-water-soluble metal salt is in the form of nanoparticles. Since it is in the form of nanoparticles, it can enhance the function of agglomerating fine particles containing fine silicon powders. Further, since the inorganic flocculant composed of the above silica sol-water-soluble metal salt exhibits the effect of adsorbing fine particles including silicon powders by $Al^{3+}$ or $Fe^{3+}$ when an aluminum salt or iron salt is used and the effect of agglomerating and precipitating fine particles by the silica sol at the same time, it can exhibit more excellent effects than a system in which silica sol and aluminum sulfate or silica sol and ferric chloride are added separately.

A description is subsequently given of the amount of the inorganic flocculant to be included into the silicon powder-containing drainage water.

In the present invention, it is important that the inorganic flocculant composed of a silica sol-water-soluble metal salt to be included into the silicon powder-containing drainage water should be included in an amount of preferably 15 to 300 mg/L, more preferably 20 to 250 mg/L in terms of a metal. Stated more specifically, the inorganic flocculant composed of a silica sol-water-soluble metal salt should be mixed with the silicon powder-containing drainage water to ensure that the amount of the metal (aluminum or iron) contained in the inorganic flocculant becomes 15 to 300 mg/L. When the amount of the inorganic flocculant to be included into the silicon powder-containing drainage water is smaller than 15 mg/L in term of a metal, the turbidity of the supernatant cannot be reduced fully disadvantageously. When the amount is larger than 300 mg/L, an excessive amount of the inorganic flocculant is used uneconomically and the bulk volume of the agglomerate increases, thereby making sedimentation concentration difficult. When the effect of reducing the turbidity of the supernatant, sedimentation concentration efficiency and economy are taken into consideration, the amount of the inorganic flocculant composed of the silica sol-water-soluble metal salt is preferably 20 to 250 mg/L in terms of a metal.

In the present invention, the pH of the silicon powder-containing drainage water containing the above inorganic flocculant within the above range (may be referred to as "treated drainage water" hereinafter) is not particularly limited but desirably controlled to preferably 5 to 10, more preferably 5.5 to 9 when the suppression of the generation of hydrogen, the agglomeration effects of the inorganic flocculant and the organic polymer flocculant and the discharge of the finally obtained treated water are taken into consideration.

In the present invention, to control the pH of the above treated drainage water to 5 to 10, a method in which pH is controlled by adding an inorganic flocculant composed of a silica sol-water-soluble metal salt to the silicon powder-containing drainage water or a method in which pH is controlled by adding an acid or alkali to the drainage water after the inorganic flocculant is added may be employed. That is, when the pH of the treated drainage water is 5 to 10, an organic polymer flocculant may be added to the drainage water directly. When the pH of the treated drainage water is outside the range of 5 to 10, after pH is controlled to 5 to 10 by adding an acid or alkali, an organic polymer flocculant can be added. When pH is to be controlled by adding only an inorganic flocculant composed of a silica sol-water-soluble metal salt to the silicon powder-containing drainage water, the pH of the silicon powder-containing drainage water may be controlled so that the pH of the treated drainage water satisfies the above range.

In the present invention, the organic polymer flocculant is then added to the above treated drainage water. By further adding the organic polymer flocculant, the coagulation treatment efficiency can be improved. The temperature for adding the organic polymer flocculant is not particularly limited but preferably 5 to 40° C., more preferably 10 to 30° C. when operation efficiency is taken into consideration.

The organic polymer flocculant used in the present invention is not particularly limited and a known flocculant may be used. Examples of the organic polymer flocculant include cationic polymer flocculants such as polyacrylamide cationized modified products, dimethyl aminoethyl polyacrylates, dimethyl aminoethyl polymethacrylates, polyethyleneimine and chitosan, nonionic polymer flocculants such as polyacrylamide, and polyacrylic acid-based and polyacrylamide-based anionic polymer flocculants such as a copolymer of acrylamide and acrylic acid and/or salts thereof, and polyacrylamide into which a sulfone group is introduced. Out of these, polyacrylamide-based anionic polymer flocculants and nonionic polymer flocculants such as polyacrylamide are preferably used.

The amount of the organic polymer flocculant to be added which is suitably adjusted according to the types and properties of the silicon powder-containing drainage water and the organic polymer flocculant is preferably 0.1 to 10 mg/L, more preferably 0.5 to 5 mg/L based on the amount of the treated drainage water. When the amount of the organic polymer flocculant satisfies the above range, the agglomerating effect can be enhanced and the drainage water can be treated efficiently without increasing separation resistance at the time of separating an agglomerated precipitate.

In the present invention, known means of separating the agglomerated precipitate after the organic polymer flocculant is added may be employed. Specific examples of the means include decantation, filter press, centrifugation, belt filter, polydisk dehydrator and screw press.

In the present invention, in order to treat a large amount of the silicon powder-containing drainage water, it is preferred that a treatment should be carried out after the optimal treating conditions, that is, the optimal pH of the silicon powder-containing drainage water, the optimal pH of the treated drainage water, the amount of the inorganic flocculant and the amount of the organic polymer flocculant are found by using a small amount of the drainage water because the amount and composition of suspended matter contained in the silicon powder-containing drainage water differ according to drainage water.

In the present invention, the turbidity of the supernatant of the treated water after the organic polymer flocculant is added can be set to 10 degrees or less by the measurement method which will be described hereinafter. Therefore, the treated water from which the above agglomerate has been separated can be discharged as drainage water without carrying out a secondary treatment and also can be recycled to the manufacturing process according to the composition of dissolved matter contained in the treated water as it has a low turbidity.

In the present invention, as the obtained agglomerate contains silicon, aluminum, iron etc., it can be recycled as a raw material for cement or a valuable resource for brick.

According to the present invention, since agglomeration efficiency is very high in the treatment of drainage water containing silicon powders, the sedimentation rate of the agglomerate is high and efficient sedimentation separation is made possible.

Since the turbidity of the drainage water from which the agglomerate has been separated can be reduced to 10 degrees or less, it can be discharged without carrying out a secondary treatment and recycled to the manufacturing process according to dissolved matter contained in the treated water. Further, since the separated agglomerate contains aluminum or iron, silica, silicon etc., it can be used as a raw material for cement and brick and therefore, can be recycled as a valuable resource.

EXAMPLES

The following examples are provided for the purpose of further illustrating the present invention but are in no way to be taken as limiting.

Measurement values in Examples and Comparative Examples were obtained by the following methods.

1) Turbidity (Degree: Kaolin as a Standard Substance)

The turbidity of the supernatant after an coagulation treatment was measured by a spectrophotometer (wavelength: 660 nm, cell length: 10 mm) in accordance with JIS K0101.

2) Measurement of pH

This was measured by TOA-HM35V (of Toa DKK Kogyo Co., Ltd.).

Manufacturing Method of Silica-Aluminum Salt Inorganic Flocculant

Manufacturing Examples 1 to 3 and Comparative Manufacturing Example 1 of Silica Sol-Water-Soluble Metal Salt Inorganic Flocculant Diluted sodium silicate ($SiO_2$: 282.8 g/L, $Na_2O$: 94.1 g/L, MR: 3.10) and diluted sulfuric acid ($H_2SO_4$: 199.9 g/L) prepared by diluting commercially available sodium silicate and sulfuric acid with water were reacted with each other for 10 minutes in a Y type collision reactor measuring 40 mm×40 mm at a sodium silicate feed rate of 6.59 L/min and a flow rate of 15.5 m/sec (nozzle diameter: 3.0 mm) and a diluted sulfuric acid feed rate of 5.65 L/min and a flow rate of 15.3 m/sec (nozzle diameter: 2.8 mm) by setting the flow rate at the time of discharge to 2.6 m/sec to obtain 122.4 L of silica sol ($SiO_2$: 151.8 g/L). This silica sol was aged until its viscosity became 10 mPa·s without stirring it and diluted with 622.8 L of water to manufacture diluted silica sol having an $SiO_2$ concentration of 25 g/L. This diluted silica sol had a pH of 1.92 and a viscosity of 3.8 mPa·s.

This diluted silica sol and aluminum sulfate were mixed together in a certain ratio and used as an inorganic flocculant composed of a silica sol-aluminum salt for treating fumed silica-containing drainage water.

The mixing ratio of the inorganic flocculant composed of a silica sol-aluminum salt is shown in Table 1. The Al concentration of aluminum sulfate used was 56.66 g/L.

TABLE 1

| | Amount of diluted silica sol (ml) | amount of aluminum sulfate (ml) | silica sol-aluminum salt inorganic flocculant | | | |
|---|---|---|---|---|---|---|
| | | | Si/Al (molar ratio) | $SiO_2$ concentration (g/L) | pH | Al concentration (g/L) |
| Manufacturing Example 1 | 100 | 400 | 0.05 | 5.0 | 2.1 | 45.2 |
| Manufacturing Example 2 | 100 | 80 | 0.25 | 13.9 | 2.1 | 25.1 |
| Manufacturing Example 3 | 100 | 20 | 1.0 | 20.8 | 2.2 | 9.4 |
| Comparative Manufacturing Example 1 | 100 | 4 | 5.0 | 24.0 | 2.3 | 2.2 |

Manufacturing Example 4 of Silica Sol-Iron Salt Inorganic Flocculant

Diluted sodium silicate ($SiO_2$: 280.0 g/L, $Na_2O$: 96.0 g/L, MR: 3.01) and diluted sulfuric acid ($H_2SO_4$: 200.1 g/L) prepared by diluting commercially available sodium silicate and sulfuric acid with water were reacted with each other for 10 minutes in a Y type collision reactor measuring 40 mm×40 mm at a sodium silicate feed rate of 6.59 L/min and a flow rate of 15.5 m/sec (nozzle diameter: 3.0 mm) and a diluted sulfuric acid feed rate of 5.68 L/min and a flow rate of 15.4 m/sec (nozzle diameter: 2.8 mm) by setting the flow rate at the time of discharge to 2.6 m/sec to obtain 122.7 L of silica sol ($SiO_2$: 150.3 g/L). This silica sol was aged until its viscosity became 10 mPa·s without stirring it and diluted with 800 L of water to manufacture diluted silica sol having an $SiO_2$ concentration of 20 g/L. This diluted silica sol had a pH of 1.90 and a viscosity of 3.0 mPa·s.

This diluted silica sol and ferric chloride were mixed together in a certain ratio and used as an inorganic flocculant composed of a silica sol-iron salt for treating silicon powder-containing drainage water.

The mixing ratio of the inorganic flocculant composed of a silica sol-iron salt is shown in Table 2. The Fe concentration of ferric chloride used was 191.8 g/L.

TABLE 2

| | amount of diluted silica sol (ml) | amount of ferric chloride (ml) | silica sol-iron salt inorganic flocculant | | | |
|---|---|---|---|---|---|---|
| | | | Si/Fe (molar ratio) | $SiO_2$ concentration (g/L) | pH | Fe concentration (g/L) |
| Manufacturing Example 4 | 100 | 39 | 0.25 | 14.4 | 2.0 | 53.8 |

Example 1

Silicon powder-containing drainage water containing 0.5 mass % of silicon powders having an average particle diameter of 12 μm and having a pH of 6.9, which was discharged when silicon chloride was manufactured, was used. The turbidity of this silicon powder-containing drainage water before a coagulation treatment was 100 or more. 500 ml of this silicon powder-containing drainage water was put into a 500 ml beaker, and 0.4 ml (20 mg-Al/L) of a solution of the silica sol-aluminum salt inorganic flocculant having an Si/Al molar ratio of 0.25 (Al: 2.51 g/100 ml) shown in Manufacturing Example 2 was added to the drainage water under agitation at 150 rpm. Since pH dropped to 4.2 after addition, it was increased to 6.5 with 1N—NaOH, and the mixture was stirred for 5 minutes. Then, 0.5 ml of the Cliflock PA331 polyacrylamide-based anionic polymer flocculant having a concentration of 0.2 mass % (trade name: manufactured by Kurita Water Industries, Ltd.) was added, stirred at 40 rpm for 5 minutes and left to stand for 10 minutes. The volume change rate of a precipitate after 5 minutes of standing and the turbidity of the supernatant sampled after 10 minutes of standing were measured. At this point, the volume change rate was 16.0% and the turbidity of the supernatant was 1.5. The results are shown in Table 3. The volume change rate is defined by the following equation. As the volume change rate becomes smaller, sedimentation efficiency becomes higher.

Volume change rate after 5 minutes of standing (%)=height of interface of precipitate from the bottom after 5 minutes of standing÷height of liquid surface×100

Example 2

Silicon powder-containing drainage water containing 0.2 mass % of silicon powders having a particle diameter of 5 μm or less and having a pH of 6.7, which was discharged when polycrystal silicon was cut, was used. The turbidity of this silicon powder-containing drainage water before a coagulation treatment was 100 or more. 500 ml of this silicon powder-containing drainage water was put into a 500 ml beaker, and 0.22 ml (20 mg-Al/L) of a solution of the silica sol-aluminum salt inorganic flocculant having an Si/Al molar ratio of 0.05 (Al: 4.52 g/100 ml) shown in Manufacturing Example 1 was added to the drainage water under agitation at 150 rpm. Since pH dropped to 4.8 after addition, it was increased to 7.5 with 1N—NaOH, and the mixture was stirred for 5 minutes. Then, 0.5 ml of the Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. The volume change rate could not be measured because the sedimentation rate was high and sedimentation ended in 5 minutes. The turbidity of the supernatant was 2.1. The results are shown in Table 3.

Example 3

500 ml of the same drainage water as in Example 2 was put into a 500 ml beaker, and 0.4 ml (20 mg-Al/L) of a solution of the silica sol-aluminum salt inorganic flocculant having an Si/Al molar ratio of 0.25 (Al: 2.51 g/100 ml) shown in Manufacturing Example 2 was added to the drainage water under agitation at 150 rpm. Since pH dropped to 4.6 after addition, it was increased to 6.9 with 1N—NaOH, and the mixture was stirred for 5 minutes. Then, 0.5 ml of the Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. The volume change rate could not be measured because the sedimentation rate was high and sedimentation ended in 5 minutes. The turbidity of the supernatant was 1.9. The results are shown in Table 3.

Example 4

500 ml of the same drainage water as in Example 2 was put into a 500 ml beaker, and 1.06 ml (20 mg-Al/L) of a solution of the silica sol-aluminum salt inorganic flocculant having an Si/Al molar ratio of 1.0 (Al: 0.94 g/100 ml) shown in Manufacturing Example 3 was added to the drainage water under agitation at 150 rpm. Since pH dropped to 4.5 after addition, it was increased to 6.7 with 1N—NaOH, and the mixture was stirred for 5 minutes. Then, 0.5 ml of the Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. The volume change rate could not be measured because the sedimentation rate was high and sedimentation ended in 5 minutes. The turbidity of the supernatant was 2.3. The results are shown in Table 3.

Example 5

500 ml of the same drainage water as in Example 2 was put into a 500 ml beaker, and 2.0 ml (100 mg-Al/L) of a solution of the silica sol-aluminum salt inorganic flocculant having an Si/Al molar ratio of 0.25 (Al: 2.51 g/100 ml) shown in Manufacturing Example 2 was added to the drainage water under agitation at 150 rpm. Since pH dropped to 4.4 after addition, it was increased to 7.3 with 1N—NaOH, and the mixture was stirred for 5 minutes. Then, 0.5 ml of the Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. The volume change rate could not be measured because the sedimentation rate was high and sedimentation ended in 5 minutes. The turbidity of the supernatant was 1.7. The results are shown in Table 3.

Example 6

500 ml of the same drainage water as in Example 2 was put into a 500 ml beaker, and 0.2 ml (20 mg-Fe/L) of a solution of the silica sol-iron salt inorganic flocculant having an Si/Fe molar ratio of 0.25 (Fe: 5.38 g/100 ml) shown in Manufacturing Example 4 was added to the drainage water under agitation at 150 rpm. Since pH dropped to 4.1 after addition, it was increased to 7.5 with 1N—NaOH, and the mixture was stirred for 5 minutes. Then, 0.5 ml of the Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. The volume change rate could not be measured because the sedimentation rate was high and sedimentation ended in 5 minutes. The turbidity of the supernatant was 1.5. The results are shown in Table 3.

Example 7

500 ml of the same drainage water as in Example 2 was put into a 500 ml beaker, and 0.4 ml (20 mg-Al/L) of a solution of the silica sol-aluminum salt inorganic flocculant having an Si/Al molar ratio of 0.25 (Al: 2.51 g/100 ml) shown in Manufacturing Example 2 was added to the drainage water under agitation at 150 rpm. Since pH dropped to 4.5 after addition, it was increased to 7.6 with 1N—NaOH, and the mixture was stirred for 5 minutes. Then, 0.5 ml of the Cliflock PN161 polyacrylamide-based nonionic polymer flocculant having a concentration of 0.2 mass % (trade name: manufactured by Kurita Water Industries, Ltd.) was added, stirred at 40 rpm for 5 minutes and left to stand for 10 minutes. The volume change rate of a precipitate after 5 minutes of standing and the turbidity of the supernatant sampled after 10 minutes of standing were measured. The volume change rate could not be measured because the sedimentation rate was high and sedimentation ended in 5 minutes. The turbidity of the supernatant was 2.0. The results are shown in Table 3.

Comparative Example 1

500 ml of the same drainage water as in Example 2 was put into a 500 ml beaker, and 0.18 ml (20 mg-Al/L) of aluminum sulfate having an Al concentration of 5.65 g/100 ml was added to the drainage water under agitation at 150 rpm. Since pH dropped to 4.3 after addition, it was increased to 6.8 with 1N—NaOH, and the mixture was stirred for 5 minutes. Then, 0.5 ml of the Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. As for the volume change rate at this point, the sedimentation rate could not be measured because some of the silicon powders were agglomerated and precipitated but the fine particles remained suspended. The turbidity of the supernatant was 100 or more. The results are shown in Table 3.

Comparative Example 2

500 ml of the same drainage water as in Example 2 was put into a 500 ml beaker, and 4.5 ml (20 mg-Al/L) of a solution of the silica sol-aluminum salt inorganic flocculant having an Si/Al molar ratio of 5.0 (Al: 0.22 g/100 ml) shown in Comparative Manufacturing Example 1 was added to the drainage water under agitation at 150 rpm. Since pH dropped to 4.1 after addition, it was increased to 7.6 with 1N—NaOH, and the mixture was stirred for 5 minutes. Then, 0.5 ml of the Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. The volume change rate was 83.7% and the turbidity of the supernatant was 9.2. The results are shown in Table 3.

Comparative Example 3

500 ml of the same drainage water as in Example 2 was put into a 500 ml beaker, and 10 ml (500 mg-Al/L) of a solution of the silica sol-aluminum salt inorganic flocculant having an Si/Al molar ratio of 0.25 (Al: 2.51 g/100 ml) shown in Manufacturing Example 2 was added to the drainage water under agitation at 150 rpm. Since pH dropped to 4.4 after addition, it was increased to 6.8 with 1N—NaOH, and the mixture was stirred for 5 minutes. Then, 0.5 ml of the Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. The volume change rate was 78.3% and the turbidity of the supernatant was 5.4. The results are shown in Table 3.

Comparative Example 4

500 ml of the same drainage water as in Example 2 was put into a 500 ml beaker, and 0.2 ml (10 mg-Al/L) of a solution of the silica sol-aluminum salt inorganic flocculant having an Si/Al molar ratio of 0.25 (Al: 2.51 g/100 ml) shown in Manufacturing Example 2 was added to the drainage water under agitation at 150 rpm. Since pH dropped to 4.5 after addition, it was increased to 6.9 with 1N—NaOH, and the mixture was stirred for 5 minutes. Then, 0.5 ml of the Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. The volume change rate was 46.5% and the turbidity of the supernatant was 12.4. The results are shown in Table 3.

TABLE 3

| | Silicon powder-containing drainage water | | | inorganic flocculant | | |
|---|---|---|---|---|---|---|
| | type | mass % | pH | Type* | Si/metal (molar ratio) | concentration (mg/L) |
| Ex. 1 | metal silicon | 0.5 | 6.9 | Si/Al | 0.25 | 20 |
| Ex. 2 | powders | 0.2 | 6.7 | Si/Al | 0.05 | 20 |
| Ex. 3 | powders | 0.2 | 6.7 | Si/Al | 0.25 | 20 |
| Ex. 4 | powders | 0.2 | 6.7 | Si/Al | 1 | 20 |
| Ex. 5 | powders | 0.2 | 6.7 | Si/Al | 0.25 | 100 |
| Ex. 6 | powders | 0.2 | 6.7 | Si/Fe | 0.25 | 20 |
| Ex. 7 | powders | 0.2 | 6.7 | Si/Al | 0.25 | 20 |
| C. Ex. 1 | powders | 0.2 | 6.7 | aluminum sulfate | | 20 |
| C. Ex. 2 | powders | 0.2 | 6.7 | Si/Al | 5 | 20 |
| C. Ex. 3 | powders | 0.2 | 6.7 | Si/Al | 0.25 | 500 |
| C. Ex. 4 | powders | 0.2 | 6.7 | Si/Al | 0.25 | 10 |

| | pH before addition of organic polymer flocculant | concentration of organic polymer flocculant (mg/L) | volume change rate** (%) | turbidity |
|---|---|---|---|---|
| Ex. 1 | 6.5 | 2 | 16.0 | 1.5 |
| Ex. 2 | 7.5 | 2 | — | 2.1 |
| Ex. 3 | 6.9 | 2 | — | 1.9 |
| Ex. 4 | 6.7 | 2 | — | 2.3 |
| Ex. 5 | 7.3 | 2 | — | 1.7 |
| Ex. 6 | 7.5 | 2 | — | 1.5 |
| Ex. 7 | 7.6 | 2 | — | 2.0 |
| C. Ex. 1 | 6.8 | 2 | not precipitated | 100 or more |
| C. Ex. 2 | 7.6 | 2 | 83.7 | 9.2 |
| C. Ex. 3 | 6.8 | 2 | 78.3 | 5.4 |
| C. Ex. 4 | 6.9 | 2 | 46.5 | 12.4 |

Ex: Example
C. Ex.: Comparative Example
*Si/Al means a silica sol-aluminum salt inorganic flocculant and Si/Fe means a silica sol-iron salt inorganic flocculant.
**means that the sedimentation rate is high and sedimentation ends in 5 minutes.

The invention claimed is:

1. A method of treating silicon powder-containing drainage water to reduce the turbidity thereof, comprising the steps of:
   including an inorganic flocculant comprising a silica sol-water-soluble aluminum salt having a molar ratio of silicon to aluminum of 0.05 to 1.5 into drainage water containing silicon powders to ensure that the aluminum concentration becomes 15 to 300 mg/l; and
   adding an organic polymer flocculant,
thereby forming an agglomerated precipitate in the drainage water; and
   separating said agglomerated precipitate from the drainage water in order to reduce the turbidity of the drainage water.

2. The treating method according to claim 1, wherein the drainage water containing silicon powders has a pH of less than 10.

3. The treating method according to claim 1 or 2, wherein the inorganic flocculant has a pH of 1.5 to 2.5 and $SiO_2$ concentration of 5 to 25 g/l.

* * * * *